United States Patent [19]

Yokonuma et al.

[11] Patent Number: 5,552,843
[45] Date of Patent: Sep. 3, 1996

[54] CAMERA CAPABLE OF READING FILM INFORMATION

[75] Inventors: Norikazu Yokonuma, Yokohama; Kazuyuki Kazami, Tokyo; Hideo Hibino; Youichi Yamazaki, both of Kawasaki, all of Japan

[73] Assignee: Nikon Corporation, Tokyo, Japan

[21] Appl. No.: 472,923

[22] Filed: Jun. 7, 1995

Related U.S. Application Data

[63] Continuation of Ser. No. 390,938, Feb. 17, 1995, abandoned, which is a continuation of Ser. No. 189,646, Feb. 1, 1994, abandoned.

[30] Foreign Application Priority Data

Feb. 3, 1993 [JP] Japan .................................. 5-016266

[51] Int. Cl.$^6$ ...................................................... G03B 7/00
[52] U.S. Cl. .................................................. 354/21; 354/275
[58] Field of Search ........................................ 354/21, 275

[56] References Cited

U.S. PATENT DOCUMENTS

| | | | |
|---|---|---|---|
| 5,025,274 | 6/1991 | Pagano | 354/21 |
| 5,032,854 | 7/1991 | Smart et al. | 354/21 |
| 5,258,789 | 11/1993 | Labaziewicz | 354/21 |
| 5,321,455 | 6/1994 | Cocca | 354/21 |

*Primary Examiner*—Monroe H. Hayes
*Attorney, Agent, or Firm*—Oliff & Berridge

[57] ABSTRACT

The present invention is applicable to a camera capable of reading in film specific information recorded by means of a bar code. This film specific information is inscribed upon a display portion which rotates together with the forwarding of a film stored within a cartridge. The camera includes: a photointerruptor which optically reads the bar code on the bar code display portion as the bar code display portion rotates together with the forwarding of the film, and which outputs as an electrical signal of the result thus read; a comparator which compares the output signal from the photointerruptor with a threshold level; a calculation device for calculating a standard value for setting the threshold level based upon the output signal from the photointerruptor; a reference value control device which controls the threshold level according to the standard value; and a determination device which determines the film specific information based upon the output of the comparator.

18 Claims, 10 Drawing Sheets

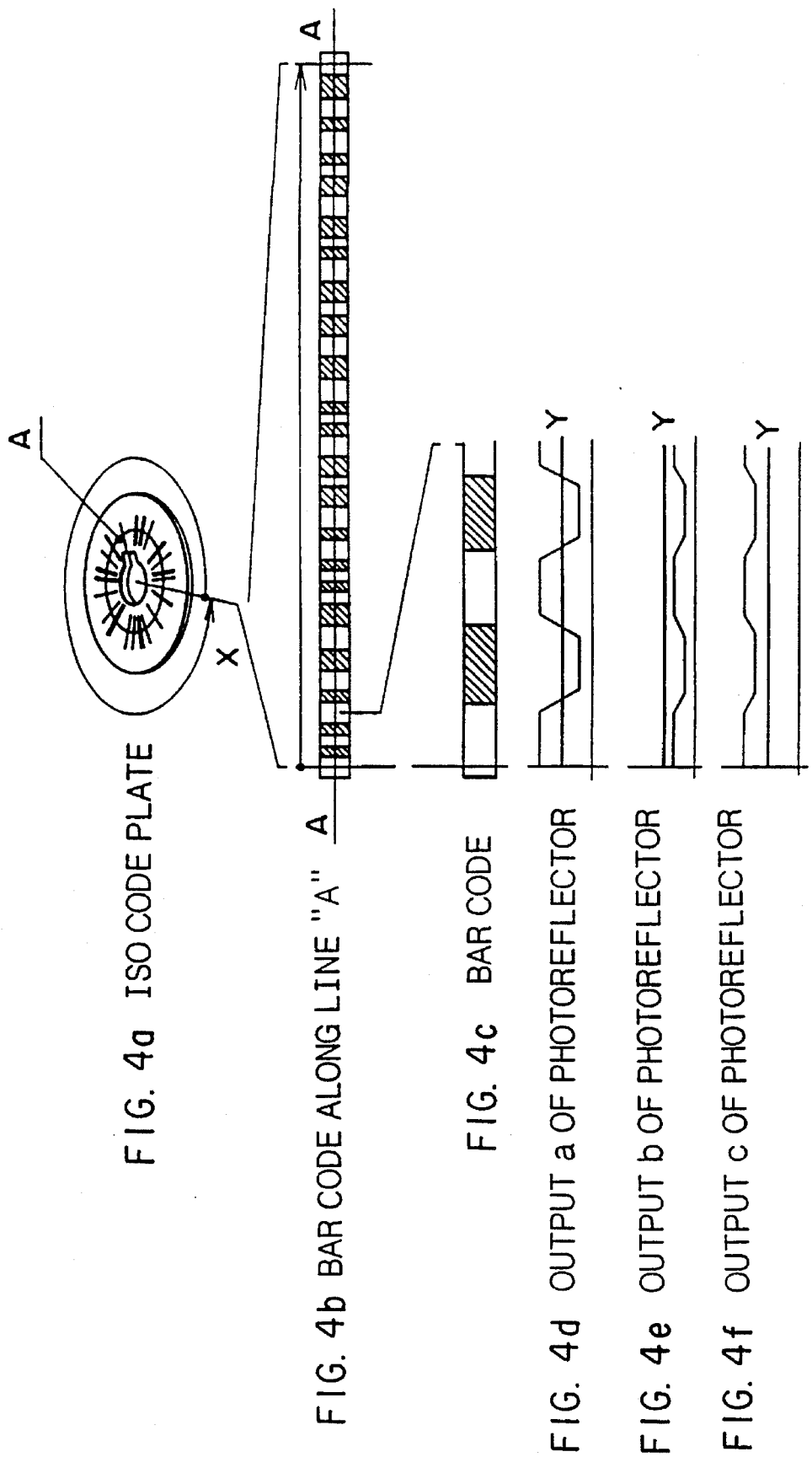

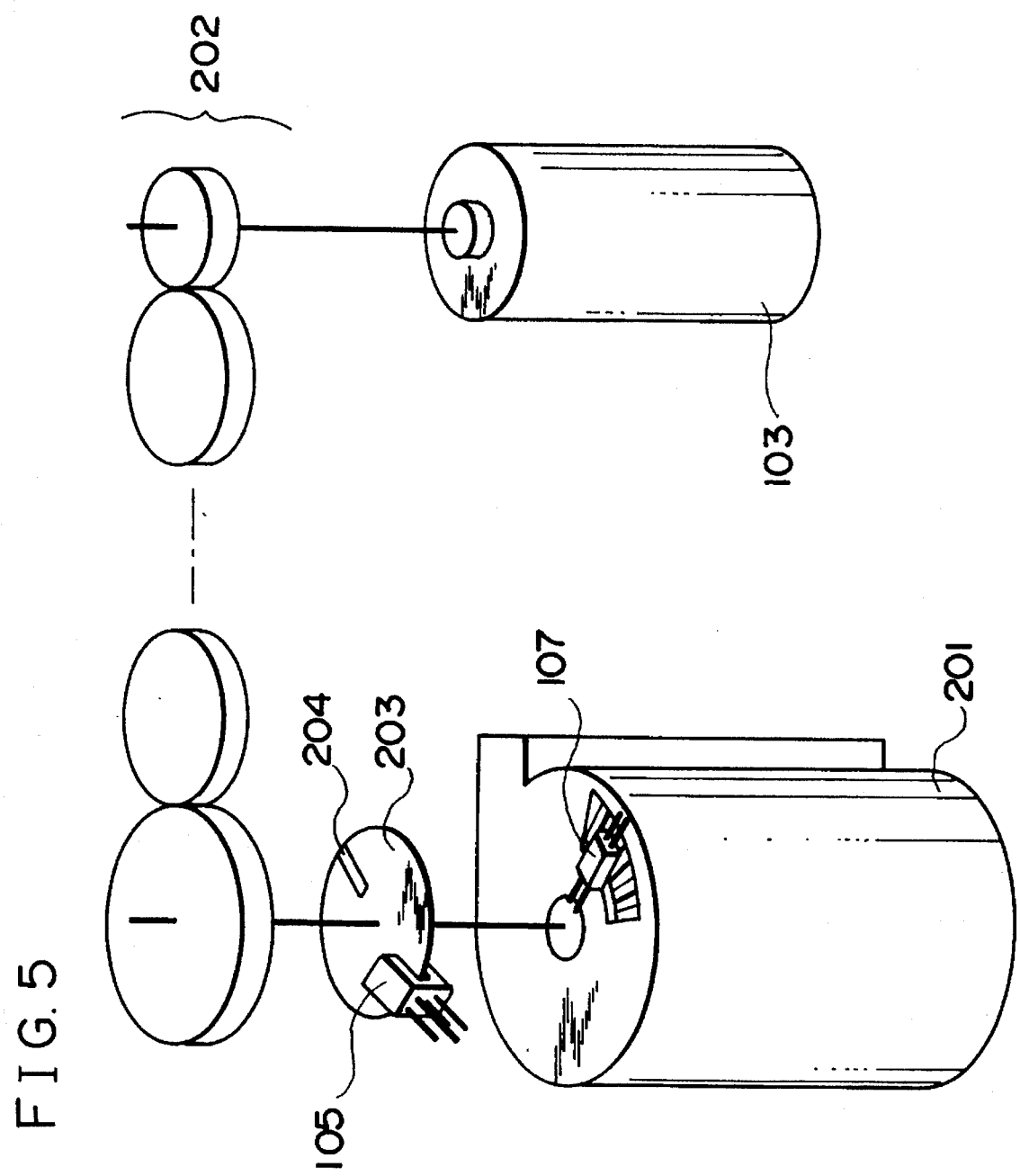

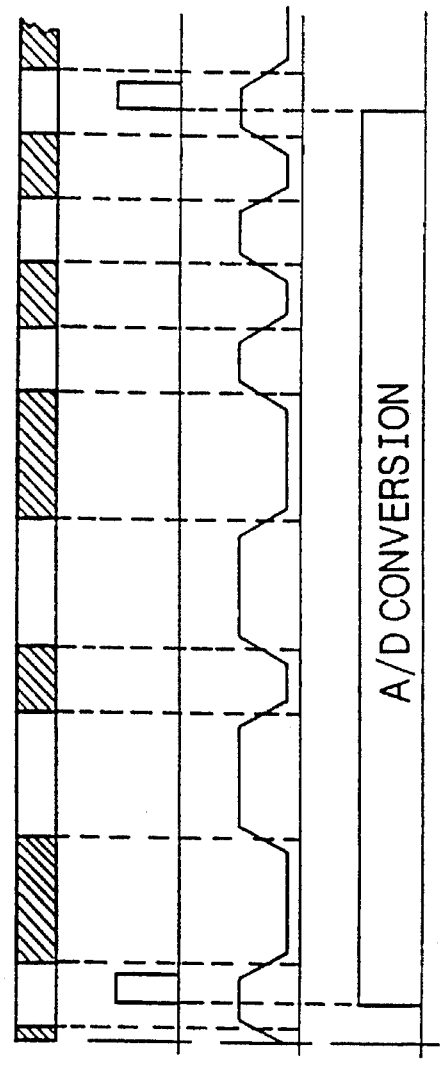

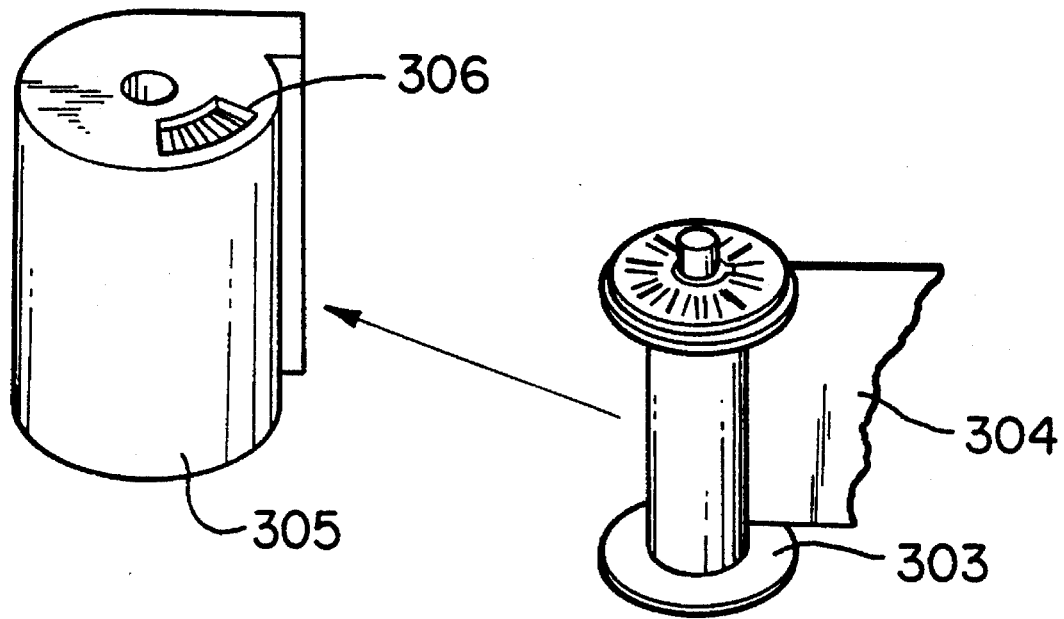
FIG. 7c
FIG. 7b
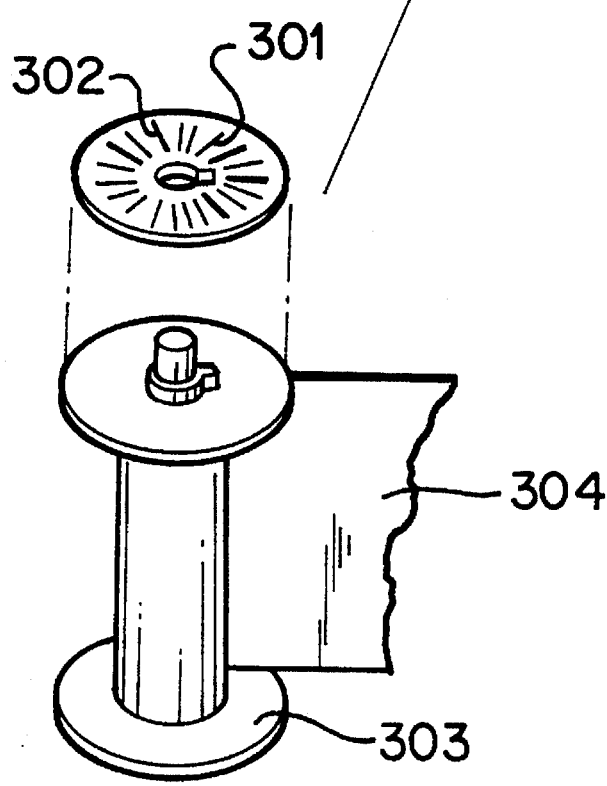
FIG. 7a

CAMERA CAPABLE OF READING FILM INFORMATION

This is a continuation of application Ser. No. 08/390,938 filed Feb. 17, 1995 abandoned, which is a continuation of Ser. No. 08/189,646 filed Feb. 1, 1994, now abandoned.

BACKGROUND OF THE INVENTION

1. Field of the Invention

The present invention relates to a camera which is capable of reading in film specific information such as ISO sensitivity or the like from a bar code which is rotating together with the rotation of a cartridge spool which is housed within a film cartridge.

2. Description of the Related Art

A film cartridge has been disclosed, for example in U.S. Pat. No. 5,025,274, in which film specific information such as ISO sensitivity or the like is displayed in bar code form by being inscribed on a disk which rotates together with the rotation of a film spool which is housed within the film cartridge. FIGS. 7(a)–(c) shows an exemplary such prior art type film cartridge.

In FIG. 7(a), the reference numeral 301 denotes a bar code which encodes information specific to the film in this film cartridge, said film specific information including (but not being limited to) ISO sensitivity of the film, while 302 denotes an ISO code plate on the upper surface of which in the figure said bar code is inscribed. This ISO code plate 302 is fixed to a film spool 303 which is housed within the film cartridge, and rotates as one body together with said film spool 303.

Generally the bar code 301 consists of a number of rod shaped black colored portions of a black color or the like having relatively low reflectivity which are disposed against a background consisting of a predetermined region of a white color or the like having relatively high reflectivity, and the desired information is encoded according to the number and the widths of these black colored portions and according to the number and the widths of the white colored remainder regions left between these black colored regions. Accordingly it is possible to read out the information which is encoded in said bar code by reading out the distribution of reflectivity from the bar code over a line which extends across the bar code 301. In the example shown in FIGS. 7(a)–(c), since the bar code 301 is inscribed around the ISO code plate 302 in the circumferential direction around the central axis of the film spool 303, it is possible to read out the information which is encoded in said bar code 301 by reading out the distribution of reflectivity following a line which extends in the circumferential direction around the upper surface of said ISO code plate 302.

As shown in FIG. 7(b), the ISO code plate 302 is affixed to the film spool 303 and a film 304 is wound upon the film spool 303, all of them then being further housed within a film cartridge 305 as shown in FIG. 7(c). A cut away portion 306 is formed through the upper surface of the film cartridge 305, and the upper surface of the ISO code plate 302 is exposed to view from the outside through this cut away portion 306. When this film cartridge 305 is loaded into a camera not particularly shown in the figure, a film forwarding device (not shown either) can rotate the film spool 303 within said film cartridge 305 either so as to project the film 304 out from said film cartridge 305 or so as to rewind said film 305 back within said film cartridge 305, and when this happens, since the ISO code plate 302 rotates together with the film spool 303, it is possible to read out the film specific information relating to ISO sensitivity or the like which is encoded in the bar code 301 via the cut away portion 306 in the film cartridge 305.

Since the upper surface of the ISO code plate 302 is exposed to view from the outside through the cut away portion 306, if a photoreflector is used which is made up from the combination of a light emitting element which illuminates the bar code 301 on the ISO code plate 302 via the cut away portion 306 and a light receiving element which receives the reflected light from said ISO code plate 302 again via said cut away portion 306, it is possible to read out the film specific information encoded in the bar code 301.

However, with a film cartridge according to the above described prior art, when the bar code 301 inscribed on the upper surface of the ISO code plate 302 is being read out, problems can occur which will now be described with reference to FIGS. 4 (a) through 4 (f).

FIG. 4(a) shows a perspective view of the ISO code plate 302 which is housed within the film cartridge 305. The circumferentially extending line A in this FIG. 4(a) is the so called readout line, which is traced when the bar code 301 is read out via the cut away portion 306 in the film cartridge 305 as the ISO code plate 302 is rotated within said film cartridge 305 about its central axis along a direction denoted by X in the figure.

FIG. 4(b) is a figure showing the bar code 41 displayed in linear form corresponding to the readout line A of FIG. 4(a). This FIG. 4(b) line from its left end to its right end corresponds to the bar code which is read out when the ISO code plate 302 is rotated through exactly one full revolution.

FIG. 4(c) is an enlarged view of the left end portion of the bar code 301 shown in FIG. 4(b). When this bar code 301 is read out using the above described photoreflector (not shown), the output signal from the photoreflector is high level when the white colored portions of said bar code 301 pass said photoreflector since their reflectivity is relatively high, while on the other hand said output signal from said photoreflector is low level when the black colored portions of said bar code 301 pass said photoreflector since their reflectivity is relatively low.

FIG. 4(d) is a waveform diagram showing the output from the photoreflector when the bar code portion in FIG. 4(c) is correctly read out. When the bar code 301 is correctly read out, the output signal from the photoreflector when the white colored portions of said bar code 301 pass it is sufficiently high, and furthermore the output signal from the photoreflector when the black colored portions of said bar code 301 pass it is sufficiently low, and accordingly, if a threshold level shown in the figure by "Y" is chosen which is substantially half of the maximum value, it is easily possible to determine which are the white colored portions of the bar code and which are its black colored portions.

However it is not possible to read in the bar code 301 accurately if as shown in FIG. 4(e) the overall output from the photoreflector is unduly low. It can happen that the overall output from the photoreflector is unduly low because the battery which serves as the power source for the photoreflector is nearly exhausted, or because the printing of the white colored portions of the bar code 301 on the ISO code plate 302 is poor so that their reflectivity is relatively low, or for other reasons. When the overall output from the photoreflector is unduly low, if the threshold level Y is set to be the same as in the case of FIG. 4(d), the output of the photoreflector which corresponds to the white colored portions of the bar code 301 remains lower than this set threshold level Y, and the bar code 301 cannot be read in accurately because it is determined to consist entirely of black colored portions.

On the other hand, if as shown in FIG. 4(*f*) the overall output from the photoreflector is unduly high, it is not possible to read in the bar code 301 accurately either. It can happen that the overall output from the photoreflector is unduly high because the battery which serves as the power source for the photoreflector is brand new, or because the printing of the black colored portions of the bar code 301 on the ISO code plate 302 is poor so that their reflectivity is relatively high, or for other reasons. When the overall output from the photoreflector is unduly high, if the threshold level Y is set to be the same as in the case of FIG. 4(*d*), the output of the photoreflector which corresponds to the black colored portions of the bar code 301 remains higher than this set threshold level Y, and the bar code 301 cannot be read in accurately because it is determined to consist entirely of white colored portions.

As explained above, in the case of a film cartridge of the type in which film specific information such as the ISO sensitivity value or the like is encoded by means of a bar code such as the bar code 301, the problem can happen, when the bar code 301 is read out by means of a photoreflector, that there is a possibility that the film specific information cannot be read out correctly, due to variation in the output of the photoreflector.

SUMMARY OF THE INVENTION

The objective of the present invention is to provide a camera which is capable of accurately reading in film specific information from a bar code, even if the output from the bar code readout means varies.

In order to attain this objective, the present invention proposes a camera capable of reading in film specific information represented by a bar code inscribed on a bar code display portion which rotates together with the forwarding of a film stored within a cartridge, comprising: a reading device which optically reads the bar code on the bar code display portion as the bar code display portion rotates together with the forwarding of the film, and which outputs an electrical signal of the result thus read; a comparison device which compares the output signal from the reading device with a reference value; a calculation device which calculates a standard value based upon the output signal from the reading device; a reference value control device which controls the reference value according to the standard value; and a determination device which determines the film specific information based upon the output of the comparison device.

Since the comparison is performed between a reference value, which is a prerequisite for detecting the film specific information, and the actual output signal from the reading device which is employed, thereby an accurate comparison can be performed even if the absolute value of the output signal from the reading device varies. In this manner, film specific information can be accurately read out from a bar code which is inscribed upon the bar code display portion.

BRIEF DESCRIPTION OF THE DRAWINGS

FIGS. 4(*a*)–(*f*) is a figure showing a photoreflector included in an exemplary camera according to the prior art, and further showing the output from this prior art photoreflector;

FIG. 5 is a schematic perspective view showing the mutual positional relationships between a film cartridge, a film, a bar code, and a motor, in the first embodiment of the present invention;

FIGS. 6(*a*)–(*d*) is a figure showing the output of a photointerruptor and a photoreflector, in this first embodiment;

FIGS. 7(*a*)–(*c*) is a separated view and an assembled view showing a film cartridge suitable for being used in this first embodiment camera; and:

DESCRIPTION OF THE PREFERRED EMBODIMENTS

First Embodiment

Figure 1:
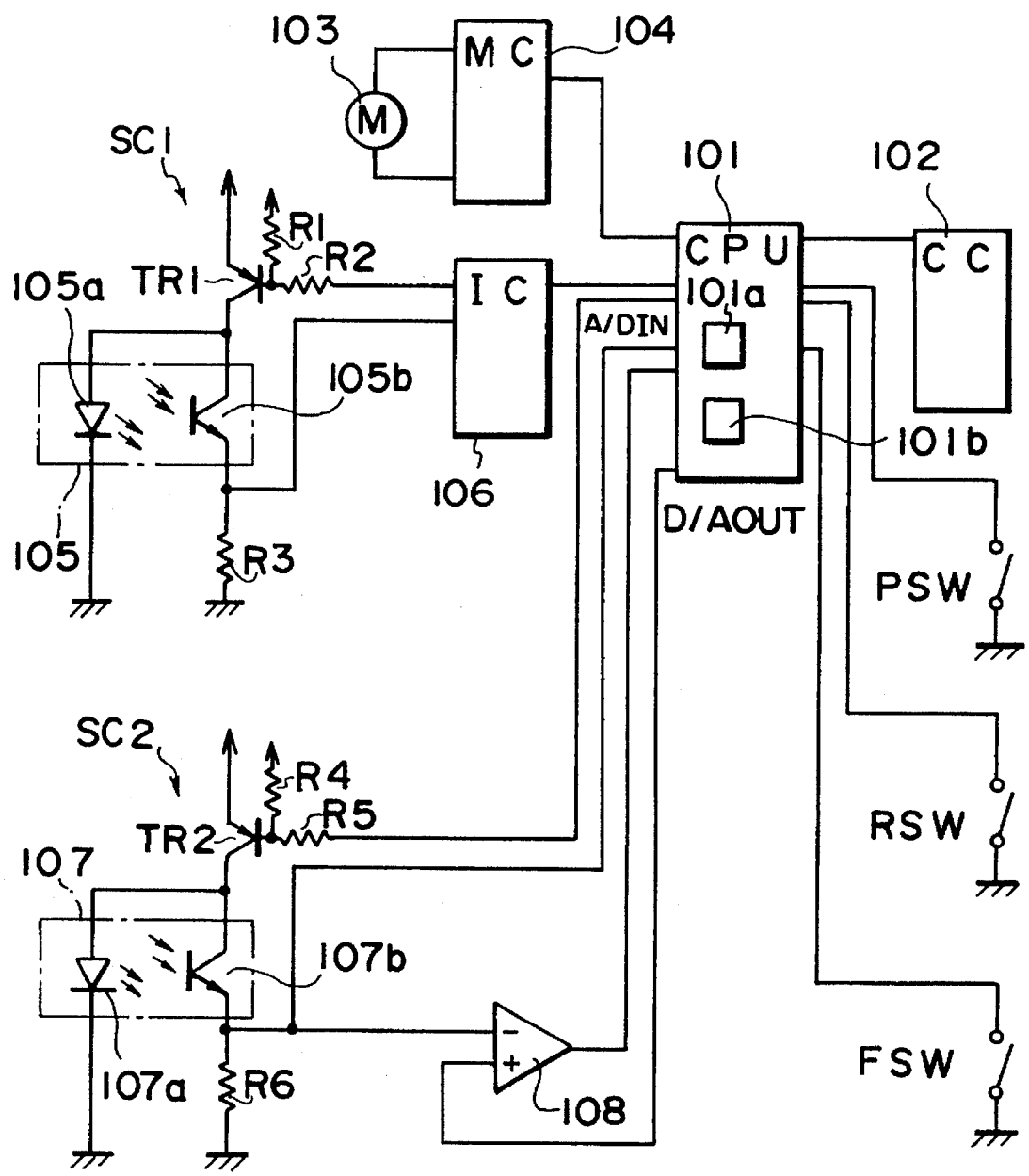
FIG. 1 is a circuit diagram showing the construction of the circuitry of a camera, capable of reading film information, which is the first embodiment of the present invention.

FIG. 1 is a circuit diagram showing the construction of the circuitry of a camera, capable of reading film information, which is the first embodiment of the present invention. The camera of this embodiment is constructed so as to be able to utilize a film cartridge which is of construction generally identical to the film cartridge 305 shown in FIGS. 7(*a*)–(*c*) and described previously. Accordingly, no detailed description of this film cartridge will be provided.

Referring to FIG. 1, the reference numeral 101 denotes a microcomputer (CPU) which controls the overall operation of the camera, and which comprises an A/D converter 101*a* which converts analog voltage values that are input to input terminals A/D IN into digital values and a D/A converter 101*b* which converts digital values into analog voltage values which are output from output terminals D/A OUT, as well as comprising a memory device, interface circuitry, a central calculation processing circuit and the like, not particularly shown in the figure.

The reference numeral 102 denotes a camera control circuit (CC) which controls photographic operations of the camera, such as photometric operation, focus detection and adjustment, film winding on, and the like. The details of how this photometric operation, focus detection and adjustment, and photographic operation are performed in practice are not particularly shown in the figures. And 103 denotes a motor (M) which winds the film 304 (see FIGS. 7(*a*)–(*c*)) out of the film cartridge, and which rewinds said film, while 104 is a motor control circuit (MC) which controls the motor 103.

105 is a photointerruptor which comprises a light emitting diode 105*a* and a phototransistor 105*b* which is disposed in such a position as directly to receive the light emitted from this light emitting diode 105*a*. And 106 is an interruptor control circuit (IC) which supplies a voltage to a switching circuit SC1 which is made up from a transistor TR1 and resistors R1 and R2 so as to drive the light emitting diode 105*a* of the photointerruptor 105, and which further, by detecting the voltage at the collector of the phototransistor 105*b*, performs control of the overall driving of the photointerruptor 105 and of the reading out therefrom.

Similarly, 107 is a photoreflector which comprises a light emitting diode 107*a* and a phototransistor 107*b* which is disposed in such a position as to receive light which has been emitted from this light emitting diode 107a and which has been reflected back. The phototransistor 107b is drive controlled by a voltage supplied to a switching circuit SC2 which is made up from a transistor TR2 and resistors R4 and R5. And 108 is a comparator (COM), to the inverted terminal (−) of which is input the voltage at the collector of the transistor 107b.

The symbol PSW denotes a power supply switch which is operationally linked to a power supply button not shown in the figures, while RSW denotes a shutter release switch which is operationally linked to a shutter release button not shown in the figures and FSW denotes a film sensor switch which is actuated when a film cartridge is charged into a cartridge chamber not shown in the figures. This film sensor switch FSW may be constituted, for example, as a limit switch which is provided on the wall of the cartridge chamber, or as a switch which detects the engagement between a drive portion of a camera not shown in the figures and the film spool.

Further, the outputs of the camera control circuit 102, of the motor control circuit 104, of the interruptor control circuit 106, of the switching circuit SC2, and of the comparator 108 described above are connected to the input or output section of the CPU 101, as are the power switch PSW, the release switch RSW, and the film sensor switch FSW. And the voltage at the collector of the phototransistor 107b of the photoreflector 107, i.e. the output of said photoreflector 107, is connected to the input terminal A/D IN of the CPU 101, while its output terminal D/A OUT is connected to the reference voltage input terminal (+) of the comparator 108. Moreover, the power switch PSW and the film sensor switch FSW are connected to respective interrupt input terminals of the CPU 101, and when either of these switches becomes conducting the voltage at its corresponding interrupt input terminal is brought to LOW level, so that an interrupt is generated for the CPU 101.

FIG. 5 is a schematic perspective view showing, in the state in which a film cartridge is charged into the cartridge chamber not shown in the figures, the mutual positional relationships between the motor 103, the photointerruptor 105, the photoreflector 107, and the film cartridge. In this figure the reference numeral 201 denotes the film cartridge, which has a construction identical to that described previously with respect to the prior art, and the details of which are shown in FIG. 7: within this film cartridge 201 there are inserted a film, a film spool, and an ISO code plate. The ISO code plate rotates as a unitary body with the film spool, and a portion of said ISO code plate is exposed to the outside through a cut away portion formed in the upper surface of the film cartridge 201.

The photoreflector 107 is disposed in a position above this cut away portion of the film cartridge 201, in such a manner that the light emitting diode 107a opposes the ISO code plate through the cut away portion and illuminates said ISO code plate, and so that the phototransistor 107b is able to receive the light which is reflected off said ISO code plate through the cut away portion. In this manner, the photoreflector 107 is able to read off the bar code which is imprinted upon the surface of the ISO code plate.

The motor 103 is mechanically linked with the film spool housed within the film cartridge 201 via a gear 202 and a engagement portion not shown in detail in the figure. Accordingly, when the motor 103 is rotated either in the forward rotational direction or in the reverse rotational direction, this driving force is transmitted to the film spool via the gear 202 and via the engagement portion, and the film is forwarded out from the film cartridge 201 or is rewound back into said film cartridge 201. In the following, the rotational direction of the motor 103 which causes the film spool to be rotated in the forwarding direction to forward the film out from the film cartridge 201 will be termed its forward rotational direction, while its rotational direction which causes the film spool to be rotated in the rewinding direction to rewind the film back into the film cartridge 201 will be termed its reverse rotational direction.

A rotary disk 203 is affixed in a unitary manner to the engagement portion, so as to rotate therewith, and a single cut away portion 204 extending in a radial direction is formed through this rotary disk 203. Accordingly, when the engagement portion is rotated by the motor 103 being driven, the rotary disk 203 and the film spool are rotated together.

The photointerruptor 105 is arranged in a position so that the rotary disk 203 interrupts the path of light from the light emitting diode 105a to the phototransistor 105b. Although the light from the light emitting diode 105a is interrupted when the rotary disk 203 is rotationally positioned so that a portion thereof other than its cut away portion 204 is interposed between the light emitting diode 105a and the phototransistor 105b, on the other hand, when the rotary disk 203 is rotationally positioned so that its cut away portion 204 is interposed between the light emitting diode 105a and the phototransistor 105b, then the light from the light emitting diode 105a is allowed to reach the phototransistor 105b, and the collector voltage of said phototransistor 105b, i.e. the output of the photointerruptor 105, goes HI level. Since only one such cut away portion 204 is formed through the rotary disk 203, the output from the photointerruptor 105 goes HI level exactly once each time that the rotary disk 203 and the ISO code plate rotate once. In this manner the rotary disk 203 and the photointerruptor 105b function as an encoder which generates a signal just once each time the rotary disk 203 rotates, and from one HI output of the photointerruptor 105 to the next HI output thereof corresponds to one rotation of the film spool and the ISO code plate.

FIGS. 6(a)–(d) is a figure showing the output of the photointerruptor 105 and the photoreflector 107. In this figure, (a) represents the bar code on the ISO code plate as read in by the photoreflector 107, extended along a straight line.

The above described ISO code plate and the rotary disk 203 rotate together. For this reason, as shown in FIG. 6(b), the photointerruptor 105 outputs a HI level signal each time the rotary disk 203 performs one full rotation, i.e. each time the ISO code plate performs one full rotation.

On the other hand, in the photoreflector 107, as described above, light is emitted by the light emitting diode 107a in the direction of the ISO code plate, and further a portion of this light that has been reflected from said ISO code plate is photoelectrically converted by the phototransistor 107b and is output as an electrical output signal. Accordingly, if a white colored portion of the bar code is illuminated, since the reflectivity of this white colored portion is high, the output of the photoreflector 107 is high, while on the other hand, if a black colored portion of the bar code is illuminated, since the reflectivity of this black colored portion is low, the output of the photoreflector 107 is low. FIG. 6(c) shows the output of the photoreflector 107 in correspondence to the bar code shown in FIG. 6(a). Since the ISO code plate and the rotary disk 203 rotate together, the portion of the output of the photoreflector 107 in the interval from when the output of the photointerruptor 105 shown in FIG. 6(b) goes HI level to the next time that the output of said photointerruptor 105 goes HI level corresponds to the complete information coded in the bar code on the ISO code plate. Accordingly, as shown in FIG. 6(d), it will be appropriate to perform A/D conversion of the output from the photoreflector 107 during the interval from a rising slope of the HI level of the output signal from the photointerruptor 105 to the next rising slope thereof. The details of the A/D conversion of the output signal from the photoreflector 107 will be described hereinafter.

Now, the operation of this camera according to the first embodiment of the present invention will be explained using the flow charts shown in FIGS. 2 and 3A–B.

Figure 2:
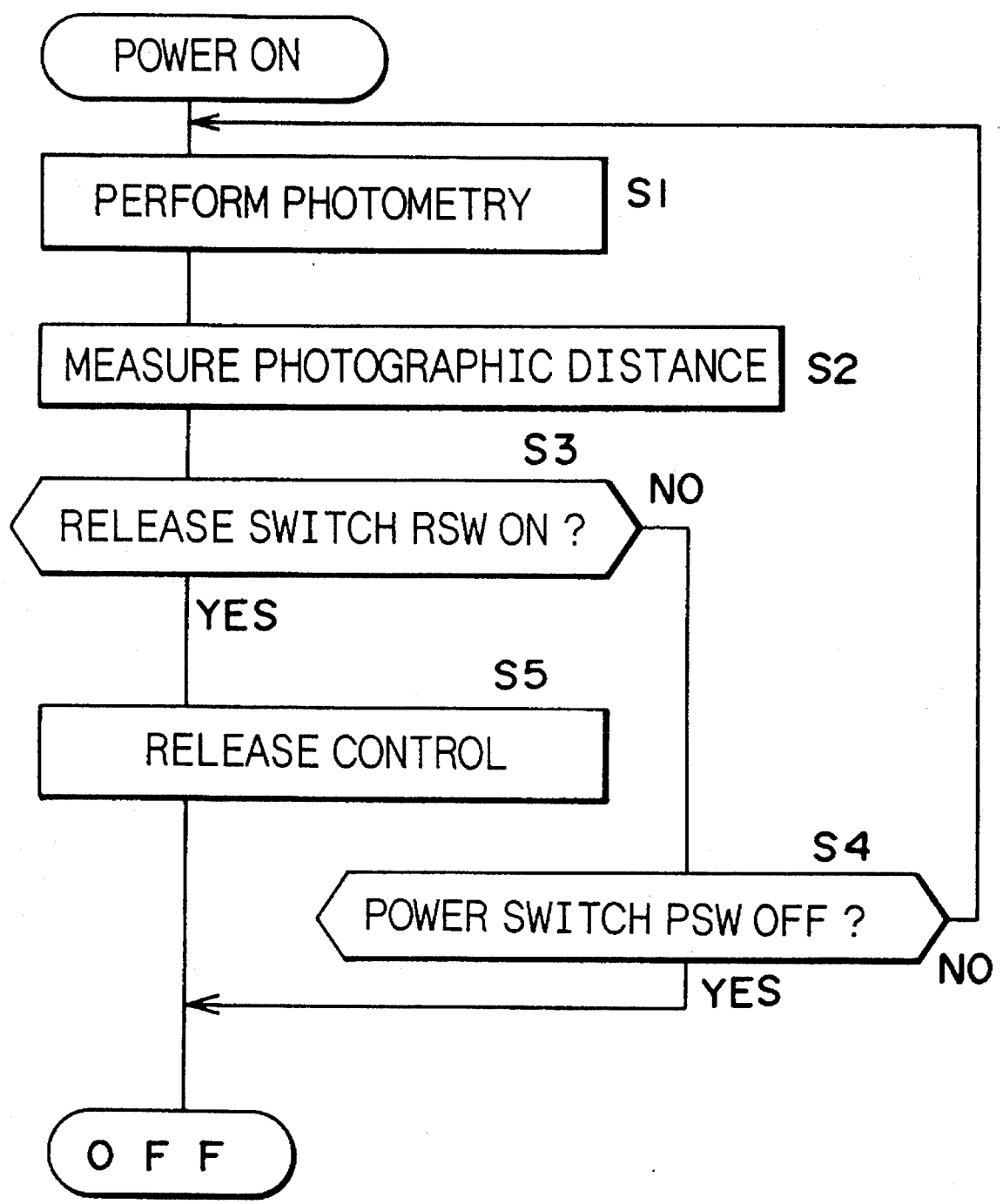
FIG. 2 is a flow chart for explanation of an aspect of the operation of this first embodiment camera.

Execution of the program shown in the FIG. 2 flow chart is commenced when the power supply button of the camera is pressed so as to turn the power switch PSW on. When the power switch PSW is turned on, the voltage at the input terminal of the CPU 101 which is connected to this power switch PSW drops to LOW level so that an interrupt is generated for the CPU 101, which causes said CPU 101 to execute an interrupt routine as described below.

First in the step S1 the camera control circuit 102 measures the brightness of the object to be photographed according to commands from the CPU 101 (automatic exposure control), using a photometric device or the like not shown in the figures. And in the next step S2 the camera control circuit 102 measures the distance to the object to be photographed according to commands from the CPU 101 (automatic focus control), using a focus detection device or the like not shown in the figures.

Next, in the decision step S3, a decision is made as to whether or not the release switch RSW is ON, and if the result of this decision is YES the flow of control is transferred to the step S5, while if the result is NO the flow of control is transferred to the decision step S4.

In the decision step S4, a decision is made as to whether or not the power switch PSW is OFF, and if the result of this decision is YES the power to the camera is turned off and processing terminates, while if the result is NO the flow of control returns back to the step S1 and the above described processing steps are repeated.

On the other hand in the step S5, according to commands from the CPU 101 and using drive devices or the like not shown in the figures, the camera control circuit 102 performs the requisite actions for exposing the next frame of the film, i.e. moves the photographic lens, controls the aperture of said lens, opens and closes the camera shutter, and then winds on the film to the next film frame. When this photographic episode has been completed, the power to the camera is turned off and processing terminates.

Figure 3A:
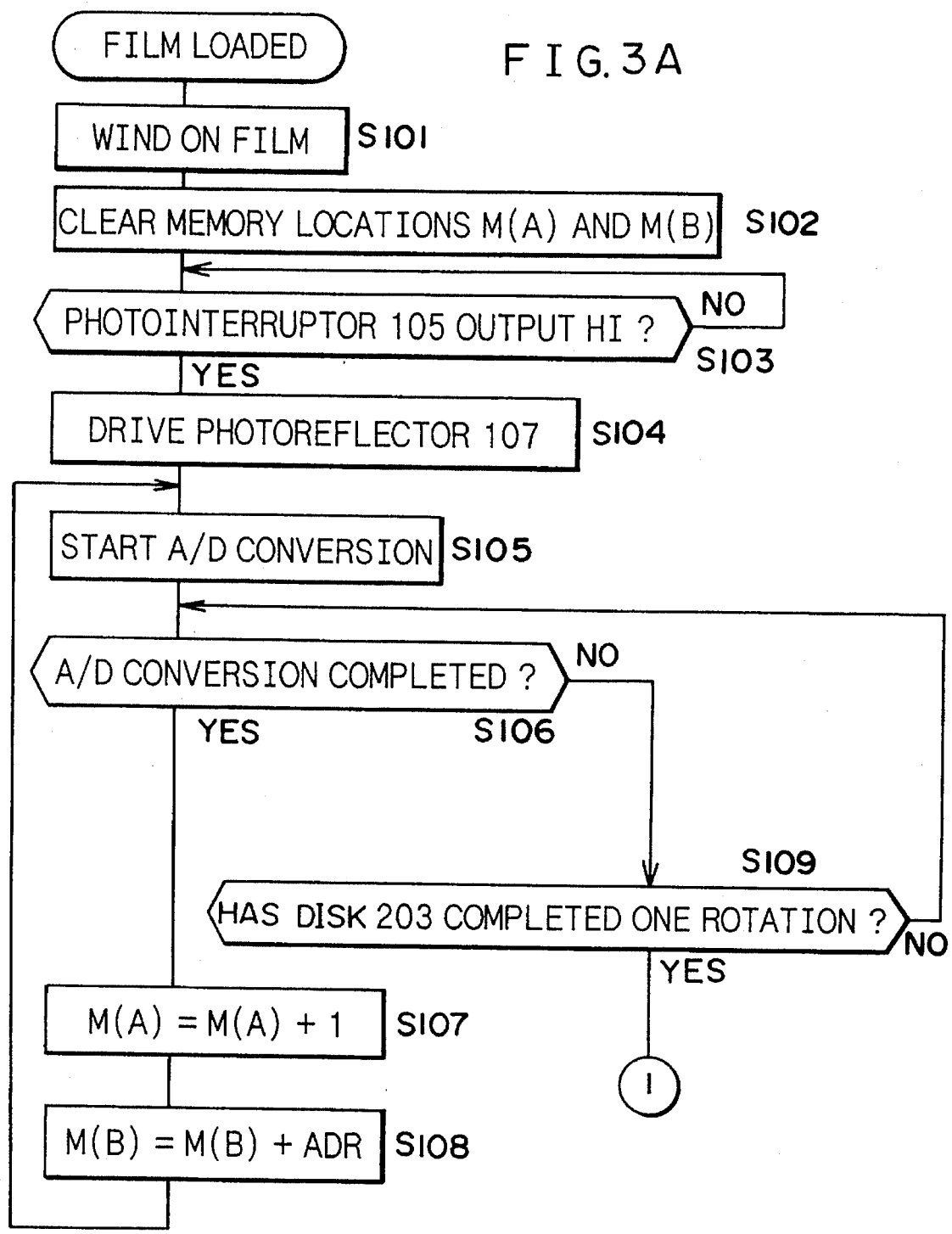
FIGS. 3A and 3B are flow charts for explanation of another aspect of the operation of this first embodiment camera.
Figure 3B:
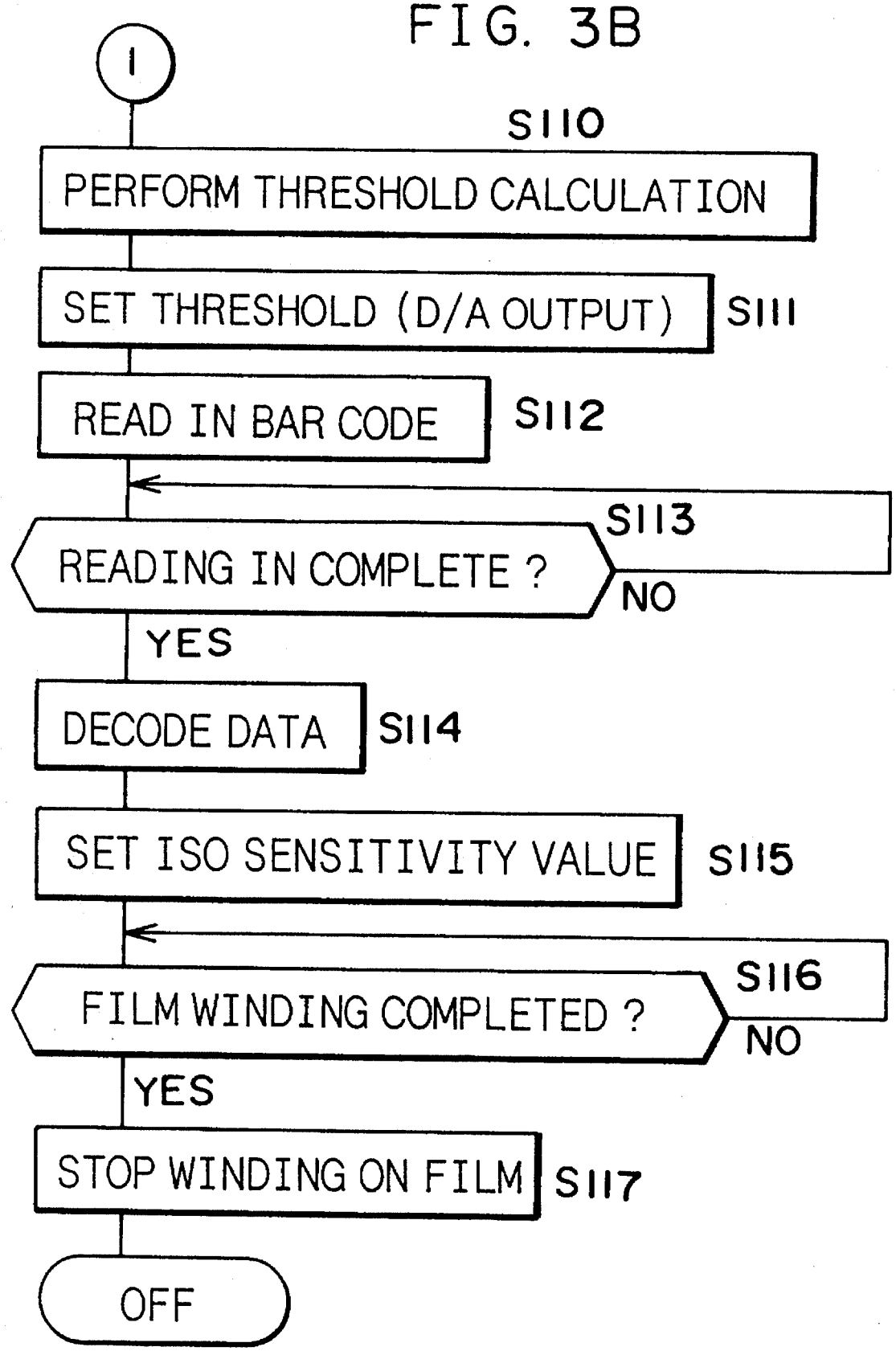

Execution of the program shown in the FIGS. 3A and 3B flow charts is commenced when a film cartridge 201 is loaded into the film cartridge chamber of the camera so as to turn the film sensor switch FSW on. When the film sensor switch FSW is turned on, the voltage at the input terminal of the CPU 101 which is connected to this film sensor switch FSW drops to LOW level so that an interrupt is generated for the CPU 101, which causes said CPU 101 to execute an interrupt routine as described below.

First, in the step S101, the motor control circuit 104 controls the motor 103, according to orders from the CPU 101, so as to rotate it in the forward rotational direction, and thereby the film is forwarded out of the film cartridge 201. At the same time the camera control circuit 102 rotates a film take up spool, not particularly shown, within the camera via a drive device which is not shown either, again according to orders from the CPU 101. In this manner, the film which is forwarded out of the film cartridge 201 is caught up onto and wound onto this film take up spool, and initial film winding on action is performed.

In the next step S102, the values stored in memory locations M(A) and M(B) of the internal memory of the CPU 101 are reset (set to zero, i.e. cleared). As will be described hereinafter, the memory location M(A) is used for storing the number of times that A/D conversion has been performed by the A/D converter 101a, while the memory location M(B) is used for storing the results of such A/D conversion (i.e., the digital values produced thereby) in totalled form.

In the next step S103, the interruptor control circuit 106 supplies a voltage to the switching circuit SC1 according to commands which it receives from the CPU 101, and thus drives the photointerruptor 105. And the program waits in the decision step S103 until the output of the photointerruptor 105 goes to HI level, i.e. waits for the cut away portion 204 of the rotary disk 203 to come to be positioned between the light emitting diode 105a and the phototransistor 105b of the photointerruptor 105; and when this happens the flow of control proceeds to the next step S104.

In the step S104, the CPU 101 supplies a voltage to the switching circuit SC2, so as to drive the photoreflector 107. And next, in the step S105, the A/D converter 101a provided within the CPU 101 is started to be operated, and the voltage at the collector of the phototransistor 107b which is being input at the A/D IN terminal at this time point, i.e. the value of the voltage output from the photoreflector 107, is subjected to the A/D conversion process.

In the next step S106, a decision is made as to whether or not the A/D conversion process being performed by the A/D converter 101a has been completed, and if the result of this decision is YES the flow of control is transferred to the step S107, while if the decision is NO then the flow of control is transferred to the step S109.

In the step S109, a decision is made as to whether or not the output of the photointerruptor 105 has again gone to HI level, i.e. as to whether or not the rotary disk 203 has completed a full rotation, and if the result of this decision is YES the flow of control is transferred to the step S110, while if the decision is NO then the flow of control loops back to the step S106, so as to repeat that processing step.

On the other hand, in the step S107, the value stored in the memory location M(A) is incremented by one, so that the value in this memory location counts the number of times A/D conversion has been performed. And next, in the step S108, the value (denoted as ADR) of the result of the last A/D conversion is added to the value stored in the memory location M(B), so that the value in this memory location contains the sum of the results of all the episodes of A/D conversion which have taken place. After this the flow of control returns to the step S105, and the above described processing steps from the step S105 are repeated.

When in the step S109 the result of the decision is YES, then it is decided that the rotary disk 203 has completed a single full rotation from its position in the step S103 in which the cut away portion 204 of said rotary encoder 203 was positioned between the light emitting diode 105a and the phototransistor 105b of the photointerruptor 105 so as to allow light to pass between them, and that said cut away portion 204 is again positioned between the light emitting diode 105a and the phototransistor 105b so as again to allow light to pass between them. Accordingly, when the rotary disk 203 has rotated through just one full rotation, the flow of control proceeds to the step S110, and a threshold calculation to be described hereinafter is performed, and until said rotary encoder 203 has rotated through just one full rotation the flow of control returns to the step S105 and A/D conversion is performed for as many times as may be. By doing this, as shown in FIGS. 6(a)–(d), A/D conversion operation is repeatedly performed during the time interval from a HI level of the output signal from the photointerruptor 105 to the next HI level thereof, and the number of times this A/D conversion is repeated and the total of the A/D conversion results obtained are stored in M(A) and M(B) respectively.

Next, in the step S110, based upon the values stored in the memory locations M(A) and M(B), the value of their ratio M(B)/M(A) is calculated. The values stored in the memory locations M(A) and M(B) at the time point when the step S110 is executed correspond to the number of times the A/D conversion has been repeated while the rotary disk 203 has rotated for a single full turn, and the total of the A/D conversion results obtained for each single full turn, respectively. Accordingly, the value of their ratio M(B)/M(A) corresponds to the average value of the A/D conversion result obtained for a single full turn of the rotary disk 203. This average value calculated in this step may be considered as the average value of the value which is output from the photoreflector 107 during a single full turn of the rotary disk 203, i.e. the average value of the output which corresponds to all the data of the bar code on the ISO code plate. Based upon this average value, a threshold level is set for the output value from the photoreflector 107, as will be explained hereinafter. The time period of A/D conversion outputs is preferably set to such a value that a plurality of outputs can be outputted from the A/D converter 101a which corresponds to the narrowest white colored portion and the narrowest black colored portion of the bar code.

In the next step Sill the average value calculated in the previous step S110 is subjected to D/A conversion by the D/A converter 101b provided within the CPU 101, and the analog voltage value corresponding to the D/A converted result, which is output from the output terminal D/A OUT, is output to the reference voltage input terminal (+) of the comparator 108. This result, the reference voltage for the comparator 108 (the threshold voltage) is set to the average output of the photoreflector 107 when the bar code has been read in using the photoreflector 107 during the interval while the rotary disk 203 has rotated for a single full turn.

In the next step S112, the system waits until the output from the photointerruptor 105 goes to HI level, and then the CPU 101 reads out the output from the comparator 108 in order and stores it in its internal memory. In the next decision step S113 the system waits in a tight loop until the output from the photointerruptor 105 again goes to HI level, and then the operation of reading out the output from the comparator 108 is terminated at the time point when the output from the photointerruptor 105 again goes to HI level, and the flow of control proceeds to the next step S114. In this manner, the output from the comparator 108 is stored in the memory of the CPU 101 during the interval from when the output of the photointerruptor 105 goes HI level to the next time that the output of said photointerruptor 105 goes HI level, i.e. during the time interval taken for the rotary disk 203 to rotate for a single full turn.

In the next step S114, data required for photography such as the ISO sensitivity of the film or the like are read out from the output of the comparator 108 thus stored in the memory, and are converted into data which can more easily be handled by the camera systems. In the step S115 this converted data is stored in a memory within the CPU 101 which is not particularly shown in the figures. The data may be converted in a per se known manner, such as for example in the manner disclosed in U.S. Pat. No. 5,025,274.

According to the above described method of operation, the average value of the output of the photoreflector 107 when the bar code is read out can be taken as a threshold level for discriminating between the white colored portions and the black colored portions of the bar code. As the method of recording the data as a bar code, the method termed "2 of 5" may be employed, and with this method, as for example shown in FIG. 6(a), all of the data is coded as five white colored portions and five black colored portions, and two each of the white colored portions and of the black colored portions are greater in circumferential extent (length in FIG. 6(a)) than are the other three, and moreover the area ratio between the white colored portions and the black colored portions is 1:1. With a bar code of this type, since the average value of the output of the photoreflector 107 is just the central value between the output which corresponds to the white colored portions and the output which corresponds to the black colored portions, if this average value of the output of the photoreflector 107 is taken as the threshold level, it is possible accurately to discriminate between the white colored portions and the black colored portions of the bar code, without any dependence upon the absolute value of the output level from the photoreflector 107; and thereby it is possible to read in the bar code conveniently and accurately.

Further, even if the area ratio between the white colored portions and the black colored portions of the bar code is not 1:1, since there cannot be existed a type of bar code which is not made up only either of white colored portions or black colored portions, therefore the average value of the output from the photoreflector 107 will certainly lie between the output from the white colored portions of the bar code and the output from the black colored portions thereof. Accordingly, since according to this first embodiment the average value of the output from the photoreflector 107 is set as the threshold level for discriminating between the white colored portions of the bar code and the black colored portions thereof, thereby it is possible to read in the bar code conveniently and accurately without any dependence upon the absolute value of the output level from the photoreflector 107.

Second Embodiment

Figure 8A:
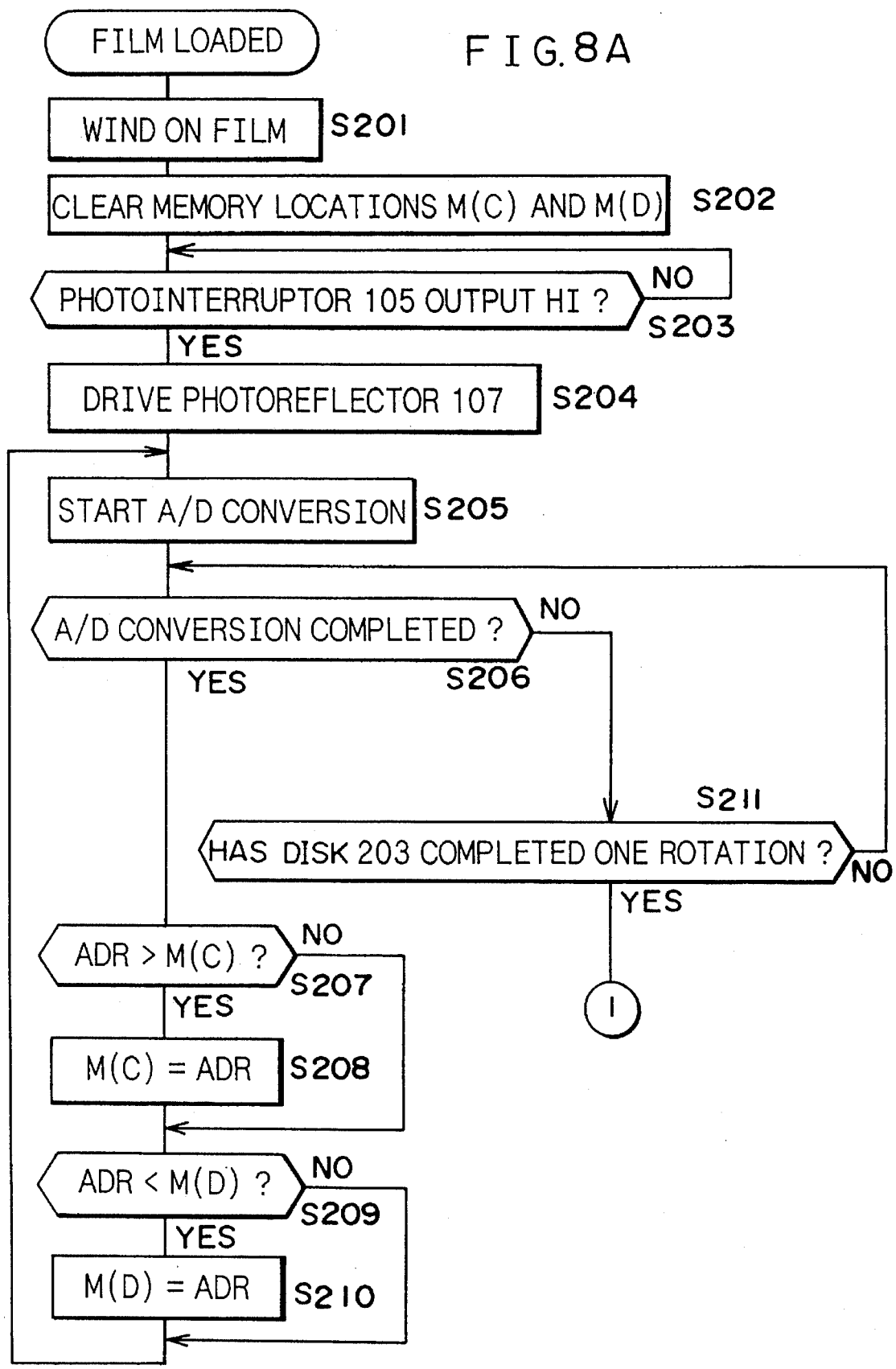
FIGS. 8A and 8B are flow charts for explanation of an aspect of the operation of the second embodiment of the camera of the present invention.
Figure 8B:
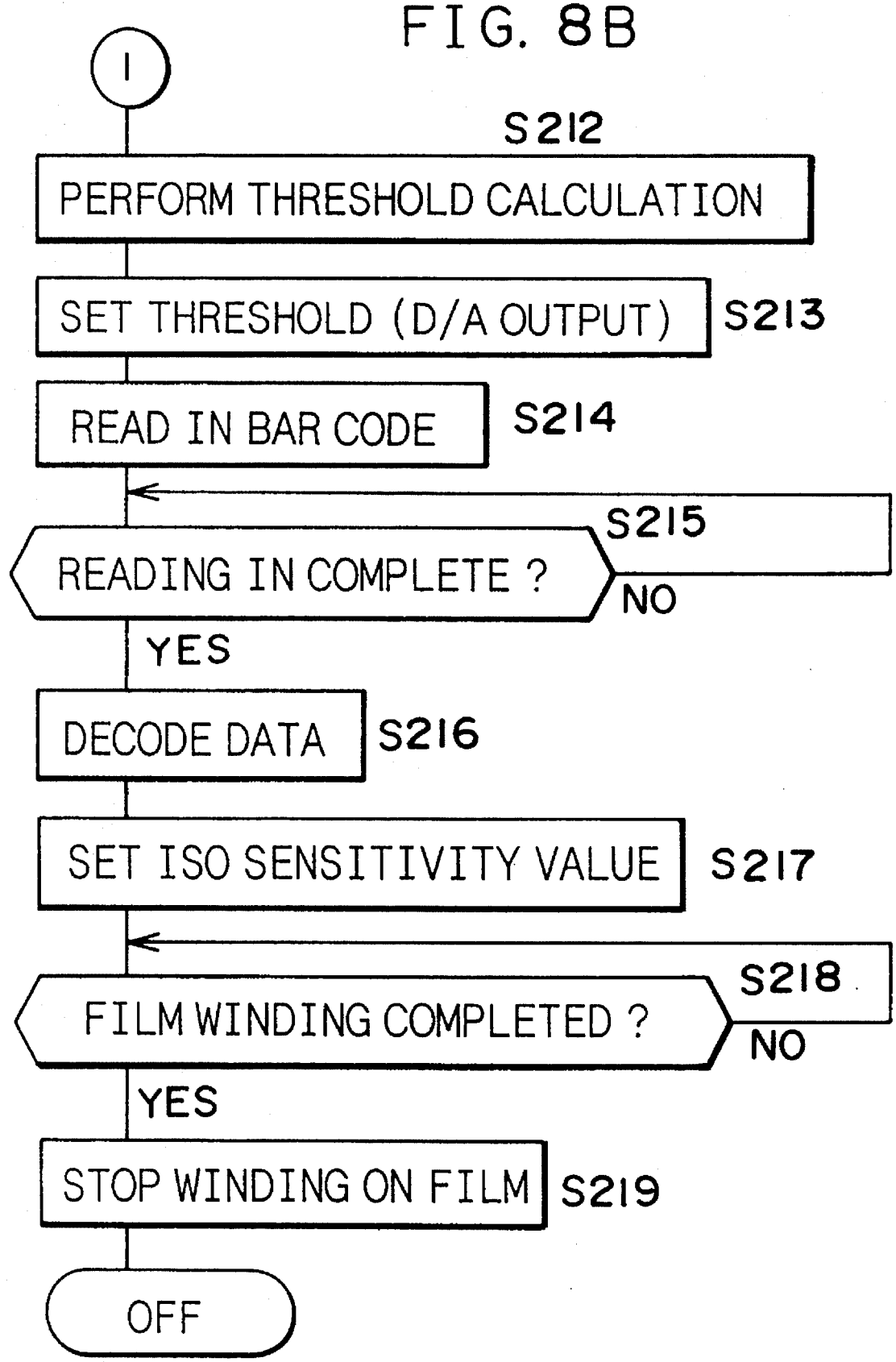

FIGS. 8A and 8B are flow charts for explanation of the operation of the second embodiment of the camera capable of reading film information according to the present invention, corresponding to the FIGS. 3A and 3B flow charts for the first embodiment. Since the construction of the camera of this second embodiment and the construction of the film cartridge which is loaded into the camera are identical to those in the case of the first embodiment, FIGS. 1, 2, and 4(a)–(f) through 7(a)–(c) described above are applicable to this second embodiment as well as to the first, with the proviso that parts in this second embodiment which correspond to parts of the first embodiment and which have the same functions are denoted by the same reference numerals. Further, concrete explanation of identical parts and operations will be omitted in the interests of brevity.

Execution of the program shown in the FIGS. 8A and 8B flow charts is commenced when a film cartridge 201 is inserted into the film cartridge chamber of the camera so as to turn the film sensor switch FSW on. When the film sensor switch FSW is turned on, the voltage at the input terminal of the CPU 101 which is connected to this film sensor switch FSW drops to LOW level so that an interrupt is generated for the CPU 101, which causes said CPU 101 to execute an interrupt routine as described below.

First, in the step S201, film winding on action is started using the motor 103 and the spool drive device, in the same manner as in the step S101 of the FIG. 3A program for the first embodiment. Next, in the step S202, the values stored in memory locations M(C) and M(D) of the internal memory of the CPU 101 are reset. In other words, the value stored in the memory location M(C) is set to zero, and the value stored in the memory location M(D) is set to a maximum value which can be stored in the memory location M(D). As will be described hereinafter, the memory location M(C) is used for storing the maximum value of the results of all the episodes of A/D conversion performed by the A/D converter 101a, while the memory location M(D) is used for storing the minimum value of the results.

In the steps S203 through S206, the same operations are performed as in the steps S103 through S106 described above for the first embodiment; and if the result of the decision in the step S206 is YES then the flow of control is transferred to the step S207, while if the result of the decision in the step S206 is NO then the flow of control is transferred to the step S211. In the step S211 the same decision is made as in the step S109 described above for the first embodiment, and if the result of the decision is YES then the flow of control is transferred to the step S212, while if the result of the decision is NO then the flow of control is returned to the step S206.

In the step S207, a comparison is made between the output (termed "ADR") of A/D conversion and the value in the memory location M(C), and if it is decided that the value of the output ADR of A/D conversion is greater than the value in the memory location M(C) then the flow of control is transferred to the step S208 and the value in the memory location M(C) is set equal to the A/D conversion result ADR, following which the flow of control goes to the step S209. On the other hand, if it is decided that the value of the output ADR of A/D conversion is equal or less than the value in the memory location M(C) then the flow of control skips directly to the step S209, bypassing the step S208.

Similarly, in the step S209, a comparison is made between the output ADR of A/D conversion and the value in the memory location M(D), and if it is decided that the value of the output ADR of A/D conversion is less than the value in the memory location M(D) then the flow of control is transferred to the step S210 and the value in the memory location M(D) is set equal to the A/D conversion result ADR, following which the flow of control returns back to the step S205. On the other hand, if it is decided that the value of the output ADR of A/D conversion is equal or greater than the value in the memory location M(D) then the flow of control returns directly back to the step S205, bypassing the step S210.

In this manner, the above described operations are repeated until the decision in the step S211 is YES, i.e. until the rotary disk 203 has completed one full turn, and the maximum value of the result ADR of A/D conversion while the rotary disk 203 completes its one full turn is stored in the memory location M(C), and similarly the minimum value of the result ADR of A/D conversion is stored in the memory location M(D).

Next, in the step S212, based upon the maximum and minimum values stored in the memory locations M(C) and M(D), the value of their median value (M(C)+M(D))/2 is calculated. Since, as will be clear from FIGS. 6(a) and 6(c), the maximum value M(C) of the result ADR of A/D conversion during the time period that the rotary disk 203 executed its one full turn corresponds to the value of the output from the photoreflector 107 which corresponds to the white colored portions of the bar code on the ISO code plate, and similarly the minimum value M(D) of the result ADR of A/D conversion during that time period corresponds to the value of said output which corresponds to the black colored portions of said bar code, this median value calculated during this step S212 is the median value between the output which corresponds to the white colored portions of the bar code and the output which corresponds to its black colored portions. This median value between the extrema will be used as a threshold level for the output value from the photoreflector 107, as described shortly.

In the steps S213 through S219 the same operations are performed as in the steps S111 through S117 described above for the first embodiment, and a threshold level is set for the value of the output from the photoreflector 107 based upon the median value of extrema calculated in the step S212, and then the white colored portions of the bar code and the black colored portions thereof are discriminated between by using this threshold level.

Accordingly, in this second embodiment as well, since the median value between extrema of the output from the photoreflector 107 is set as the threshold level for discriminating between the white colored portions of the bar code and the black colored portions thereof, thereby it is possible to read in the bar code conveniently and accurately without any dependence upon the absolute value of the output level from the photoreflector 107.

It should be understood that the details of the structure and the function of the camera capable of reading film information according to the present invention are not to be considered as being limited by any features of the two embodiments described above, since many variations thereof are possible. As an example of a possible variation, although in the two embodiments described above the threshold level was set based upon the average value of the result of A/D conversion, or upon the median value between the extrema of said result of A/D conversion, this is not to be considered as limiting with respect to the present invention. For example, it would be possible to set the threshold level by adding a predetermined value to the value obtained in the previous stage for the threshold level, i.e. to the value in the memory location M(B), M(C), M(D) or the like, or by subtracting a predetermined value therefrom. Or, as another modification, it would be possible to set the threshold level by multiplying the value obtained in the previous stage for the threshold level by a predetermined value, or by dividing it by a predetermined value. Further, the format for the bar code is not to be considered as being limited to that which was discussed, since any bar code format which displays prescribed information in a pattern of white colored portions and black colored portions can be utilized for the camera of the present invention. Accordingly, although the present invention has been shown and described in terms of several preferred embodiments thereof, it is not to be considered as limited by any of the perhaps quite fortuitous details of said embodiments or of the drawings, but only by the terms of the appended claims, which follow.

We claim:

1. A camera capable of reading in film specific information represented by a bar code inscribed on a bar code display portion which rotates together with the forwarding of a film stored within a cartridge, the camera comprising:

a reading device which optically reads said bar code on said bar code display portion as said bar code display portion rotates together with the forwarding of said film, and which outputs an electrical signal of the bar code;

a comparison device which compares the output signal from said reading device with a reference value;

a calculation device which calculates a standard value based upon the output signal from said reading device;

a reference value control device which controls said reference value according to said standard value; and a determination device which determines said film specific information based upon the output of said comparison device.

2. A camera according to claim 1, said cartridge including a spool on which said film is wound, wherein said bar code display portion is formed so as to be rotatable together with said spool as a unit.

3. A camera according to claim 1, wherein said reading device outputs an analog electrical signal, and wherein said calculation device includes:

an A/D conversion device which, upon input of a command signal, converts said analog electrical signal output from said reading device into a digital signal and outputs it;

a control device which sends a command signal to said A/D conversion device a plurality of times and thereby causes said A/D conversion device to operate a plurality of times;

a standard value calculation device which calculates said standard value as a digital signal, based upon a plurality of instances of the digital output signal from said A/D conversion device as it thus operates a plurality of times; and a D/A conversion device which converts said digital signal representing said standard value into an analog signal;

and wherein said comparison device includes an analog comparator, said analog signal output from said D/A conversion device being input to a reference voltage input terminal of said analog comparator.

4. A camera according to claim 1, wherein said film specific information includes film sensitivity information.

5. A camera according to claim 1, further comprising a film movement device which moves said film to a position in which photography can be performed, wherein said determination device determines said film specific information before the film movement is completed by said film movement device.

6. A camera according to claim 3, wherein said standard value calculation device includes an average value calculation device which calculates said standard value as the average value of a plurality of instances of the digital output signal from said A/D conversion device.

7. A camera according to claim 3, wherein said standard value calculation device includes an extreme value calculation device which calculates said standard value based upon the maximum value and the minimum value of a plurality of instances of the digital output signal from said A/D conversion device.

8. A camera according to claim 7, wherein said extreme value calculation device calculates said standard value as the median of said maximum value and said minimum value.

9. A camera according to claim 1, wherein:

until the end of the time period that said bar code display portion executes a single complete revolution, said calculation device calculates said standard value and said reference value control device controls the value of said reference value according to the calculated standard value; and said determination device determines said film specific information based upon the output signal from said reading device during the time period that said bar code display portion executes a single complete revolution after calculation of said standard value.

10. A camera according to claim 9, wherein said cartridge is so constructed that even when said bar code display portion has executed two complete revolutions the film has not yet reached a position in which photography can be performed.

11. A camera according to claim 6, wherein said bar code includes substantially white colored portions which have relatively high reflectivity and substantially black colored portions which have relatively low reflectivity, and the ratio of the total area of said substantially white colored portions to the total area of said substantially black colored portions is approximately 1:1.

12. A camera according to claim 1, further comprising a rotation number detection device for detecting the number of rotation of said bar code display portion.

13. A camera according to claim 12, wherein said rotation number detection device comprises:

a rotary disk having a light permission portion through which light passes, rotating together with said bar code display portion, and a photointerruptor between which said rotary disk is provided so as to detects light passing through said light permission portion as said rotary disk rotates.

14. An information processing device capable of reading in film specific information represented by a bar code inscribed on a bar code display portion which rotates together with the forwarding of a film stored within a cartridge, the information processing device comprising:

a reading device which optically reads said bar code on said bar code display portion as said bar code display portion rotates together with the forwarding of said film, and which outputs an electrical signal of the bar code;

a comparison device which compares the output signal from said reading device with a reference value;

a calculation device which calculates a standard value based upon the output signal from said reading device;

a reference value control device which controls said reference value according to said standard value; and a determination device which determines said film specific information based upon the output of said comparison device.

15. An information processing device capable of reading in film specific information represented by a bar code inscribed on a bar code display portion which rotates together with the forwarding of a film stored within a cartridge, the information processing device comprising:

a reading device which optically reads said bar code on said bar code display portion as said bar code display portion rotates together with the forwarding of said film, and which outputs an electrical signal of the bar code;

a reference value generator which generates a reference value in accordance with the output from said reading device; and a discriminating device which discriminates said film specific information on a basis of the output from said reading device and said reference value from said reference value generator.

16. A camera equipped with an information processing device capable of reading in film specific information represented by a bar code inscribed on a bar code display portion which rotates together with the forwarding of a film stored within a cartridge, the information processing device comprising:

- a reading device which optically reads said bar code on said bar code display portion as said bar code display portion rotates together with the forwarding of said film, and which outputs an electrical signal of the bar code;
- a reference value generator which generates a reference value in accordance with the output from said reading device; and
- a discriminating device which discriminates said film specific information on a basis of the output from said reading device and said reference value from said reference value generator.

17. An information processing device capable of reading in film specific information represented by a bar code inscribed on a bar code display portion which rotates together with the feeding of a film loaded within said information processing device, the information processing device comprising:

- a reading device which optically reads said bar code on said bar code display portion as said bar code display portion rotates, and which outputs an electrical signal of the bar code;
- a reference value generator which generates a reference value in accordance with the output from said reading device; and
- a discriminating device which discriminates said film specific information on a basis of the output from said reading device and said reference value from said reference value generator.

18. A camera equipped with an information processing device capable of reading in film specific information represented by a bar code inscribed on a bar code display portion which rotates together with the feeding of a film loaded within said information processing device, the information processing device comprising:

- a reading device which optically reads said bar code on said bar code display portion as said bar code display portion rotates, and which outputs an electrical signal of the bar code;
- a reference value generator which generates a reference value in accordance with the output from said reading device; and
- a discriminating device which discriminates said film specific information on a basis of the output from said reading device and said reference value from said reference value generator.

\* \* \* \* \*